May 23, 1950      G. E. ROWE      2,508,890
APPARATUS FOR FORMING GLASSWARE
Filed Sept. 13, 1941      6 Sheets-Sheet 1

Inventor
George E. Rowe.
by Brown & Parham
Attorneys

May 23, 1950 G. E. ROWE 2,508,890
APPARATUS FOR FORMING GLASSWARE
Filed Sept. 13, 1941 6 Sheets-Sheet 2
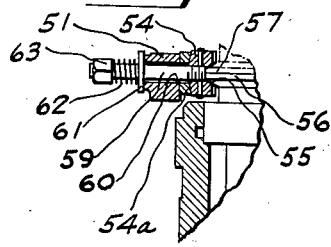
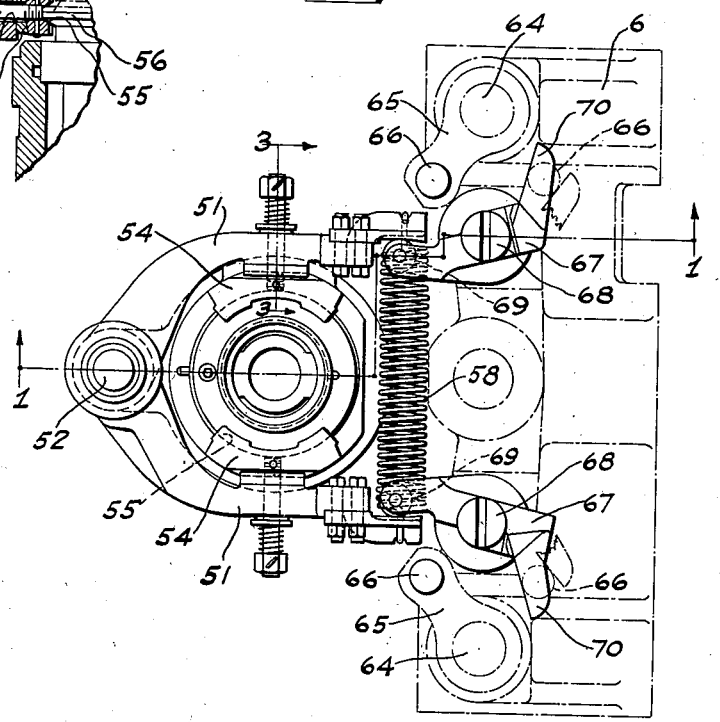
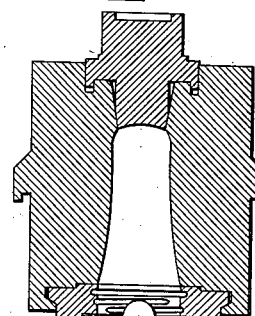
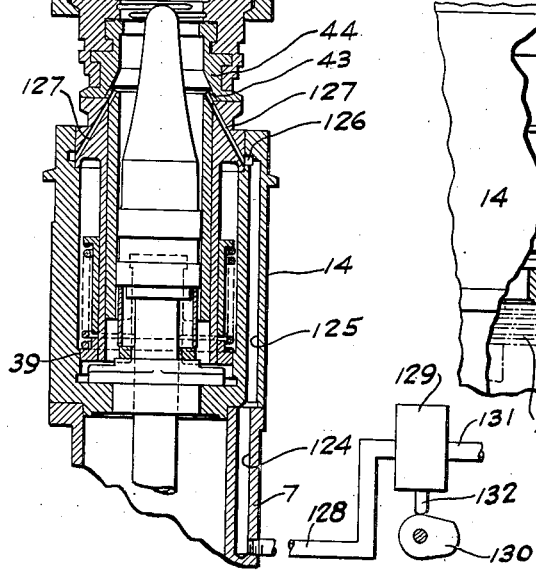
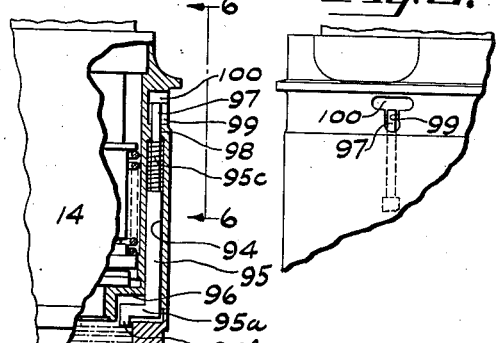
Inventor
George E. Rowe.
by Brown + Parham
Attorneys Fig. 7.
Fig. 8.
Fig. 9.
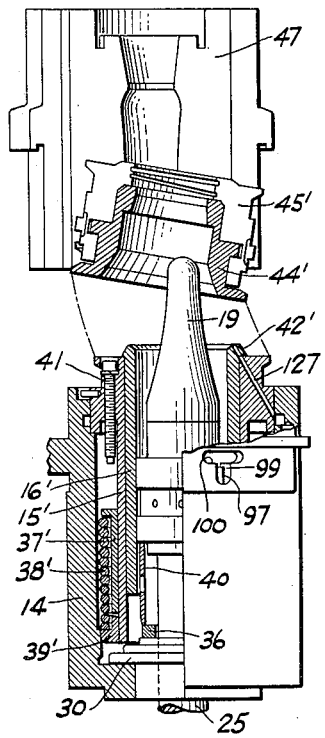
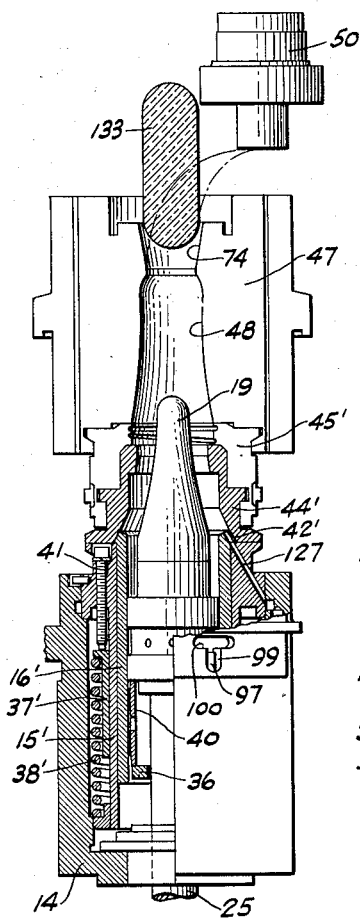
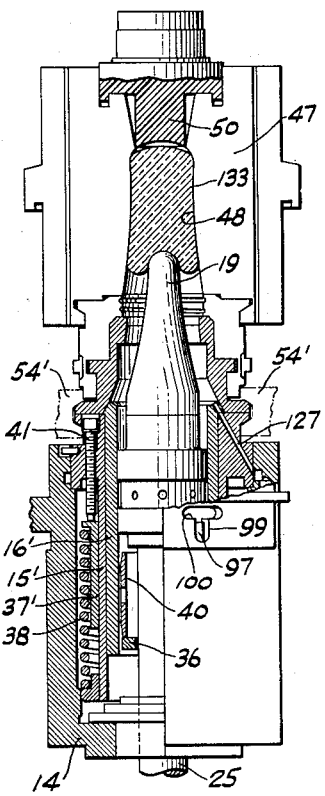

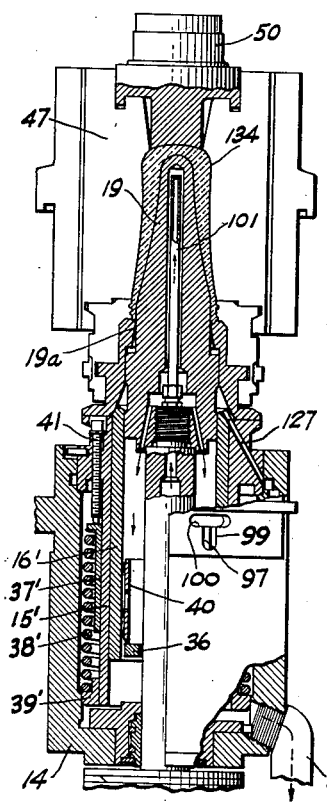
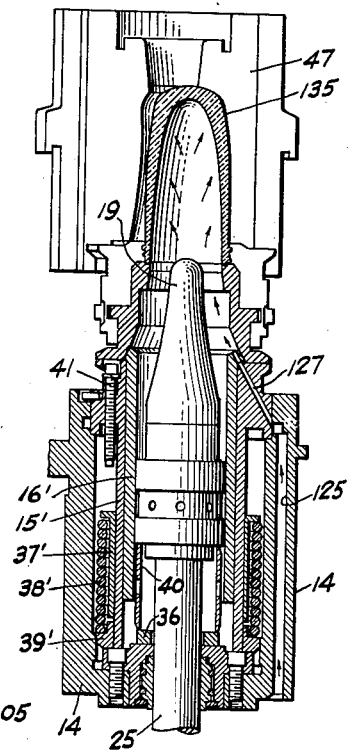
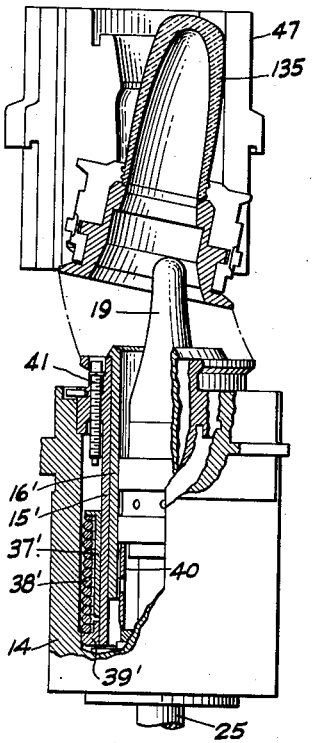

May 23, 1950 — G. E. ROWE — 2,508,890
APPARATUS FOR FORMING GLASSWARE
Filed Sept. 13, 1941 — 6 Sheets-Sheet 5
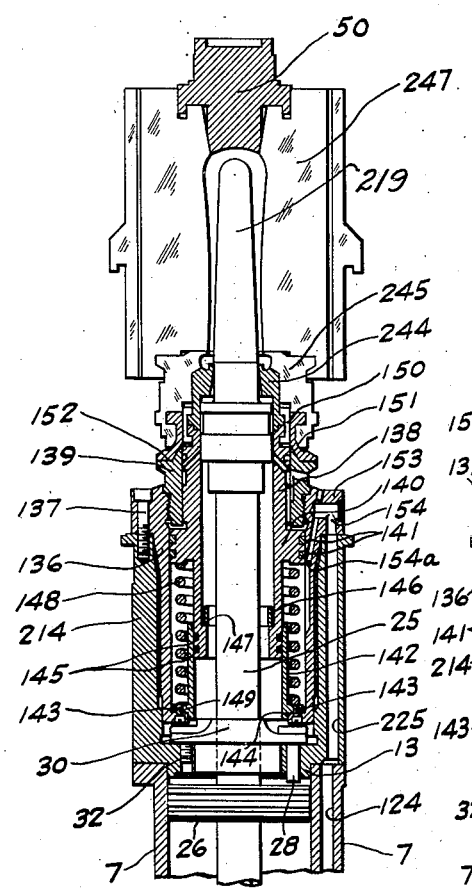
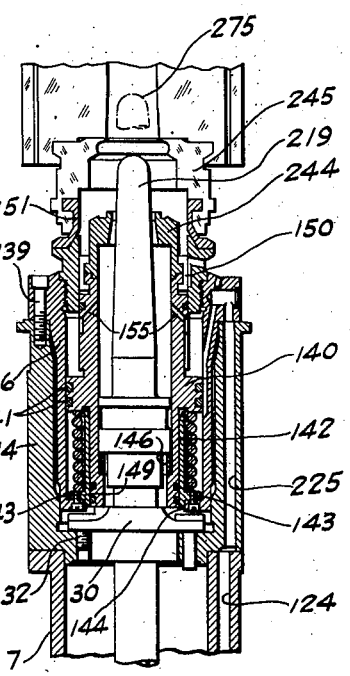
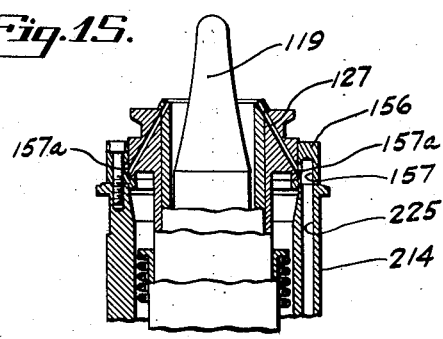
Inventor
George E. Rowe.
by Brown & Parham
Attorneys May 23, 1950 G. E. ROWE 2,508,890
APPARATUS FOR FORMING GLASSWARE
Filed Sept. 13, 1941 6 Sheets-Sheet 6
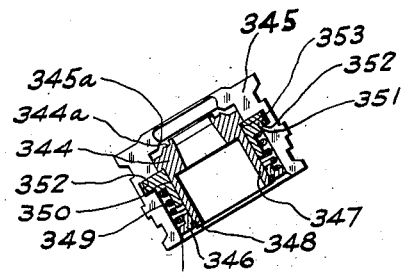
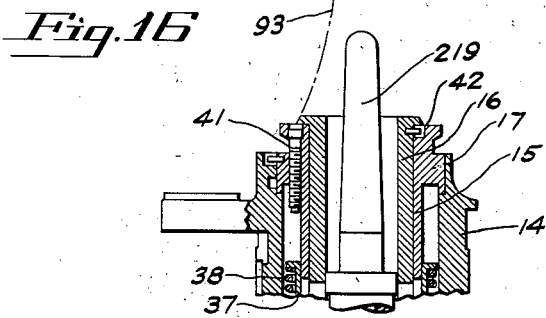
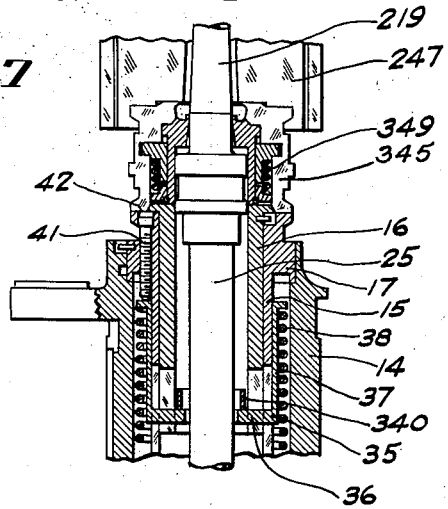
Inventor
George E. Rowe.
by Brown & Parham
Attorneys Patented May 23, 1950

2,508,890

UNITED STATES PATENT OFFICE 2,508,890

APPARATUS FOR FORMING GLASSWARE

George E. Rowe, Wethersfield, Conn., assignor to Hartford-Empire Company, Hartford, Conn., a corporation of Delaware Application September 13, 1941, Serial No. 410,747

18 Claims. (Cl. 49—5)

This invention relates to the manufacture of articles of glassware, such as bottles, jars and other containers.

The invention is primarily concerned with improvements in apparatus for forming glass charges into hollow glass bodies, especially hollow parisons having neck finish or finished rim portions at the open ends thereof.

The invention provides improvements in apparatus over the apparatus and methods of my copending prior application, Serial No. 285,260, filed July 19, 1939, for Method of and apparatus for forming glassware, on which Patent No. 2,289,046 was granted on July 7, 1942.

In my aforesaid prior application, I disclose means for and methods of forming glass charges into hollow glass parisons by a procedure which involves the delivery of each such charge from a producing agency downwardly into a parison forming unit comprising an inverted parison body press mold and an inverted neck mold at the lower end of the body press mold. According to this procedure, downward movement of the charge is checked at a predetermined level within the forming unit so that the charge is supported as an entity at its axis by a tapering upper end portion of a vertically movable pressing plunger while glass of the charge at the periphery thereof may shift or creep downwardly on the plunger. The charge is raised as an entity by an upward axial movement of the plunger in the forming unit to press from within the charge part of the glass thereof into molding contact with the internal walls of the inverted parison body press mold and to displace the remainder of the glass of the charge downwardly into molding contact with the walls of the space around the plunger within the neck mold. The hollow parison thus formed may be transferred by a bodily movement of the neck mold to another station at which the parison may be formed in a final blow mold into an article of the final shape desired, the parison press mold of course having first been opened to permit such bodily movement of the neck mold and of the parison supported thereby.

An object of the present invention is to provide an improved structure for guiding, positioning and operating the pressing plunger of apparatus for forming hollow glass parisons or hollow bodies according to the general procedure above described, such improved structure being constructed and arranged to retract the plunger downwardly after each pressing stroke thereof to a level below that at which the plunger tip first contacts with the glass charge to check downward movement of the latter in the forming unit, and thereafter to move the plunger upwardly to its glass charge contacting position from which it will be moved upward for its next pressing stroke. This downward retraction of the plunger after its pressing stroke provides clearance for bodily movement of the neck mold to transfer the pressed hollow parison along a desired path to an adjacent, laterally spaced station at which such parison is to receive further treatment or handling.

Another object of the invention is to provide improved means for and a novel way of cooling the interior of the pressing plunger to control the temperature of the glass contacting portion thereof.

A further object of the invention is to provide novel and effective means for aligning the pressing plunger with the cooperative molding parts of the parison forming unit and for maintaining such alignment during each parison forming operation.

A further object of the invention is to provide reliable and efficient means of simple construction for indicating as each charge is pressed into a hollow glass parison whether or not the pressing plunger that is being used is correctly located when it has completed its pressing stroke.

Other objects and advantages of the invention will hereinafter be pointed out or will be obvious from the following description of structural embodiments of the present invention, as shown in the accompanying drawings, and of the use thereof to form mold charges into hollow glass bodies.

In the drawings:

Fig. 1 is a vertical section through an assembly of a parison forming unit, including a vertical pressing plunger, together with improved means provided by the invention for guiding, positioning and operating the plunger, for cooling the plunger, and for effecting and maintaining desirable alignment of the plunger with the cooperative molding parts of the parison forming unit during parison forming operations, the view being approximately along the line indicated at 1—1 of Fig. 2 but including parts of the assembly which have been omitted from Fig. 2;

Fig. 2 is a plan view of the neck mold and underlying parts of the aforesaid assembly, showing particularly the locking means for clamping the neck mold and the underlying plunger guiding means together in vertically aligned relation for the parison forming operation;

Fig. 3 is a fragmentary sectional view, substantially along the line 3—3 of Fig. 2, showing a detail of the clamping means;

Fig. 4 is a vertical sectional view of part of the assembly of Fig. 1, taken on a vertical plane different from that of Fig. 1, showing structural provisions of the invention for supplying air to the interior of the forming unit at one stage in the operation of forming a hollow parison;

Fig. 5 is a fragmentary view, partly in elevation and partly in vertical section, showing the plunger position indicating provisions of the plunger guiding and operating mechanism;

Fig. 6 is an elevation of a fragmentary portion of the plunger guiding and operating mechanism, showing the plunger position indicating provisions as they appear when viewed from the plane indicated by the line 6—6 of Fig. 5;

Figure 1:
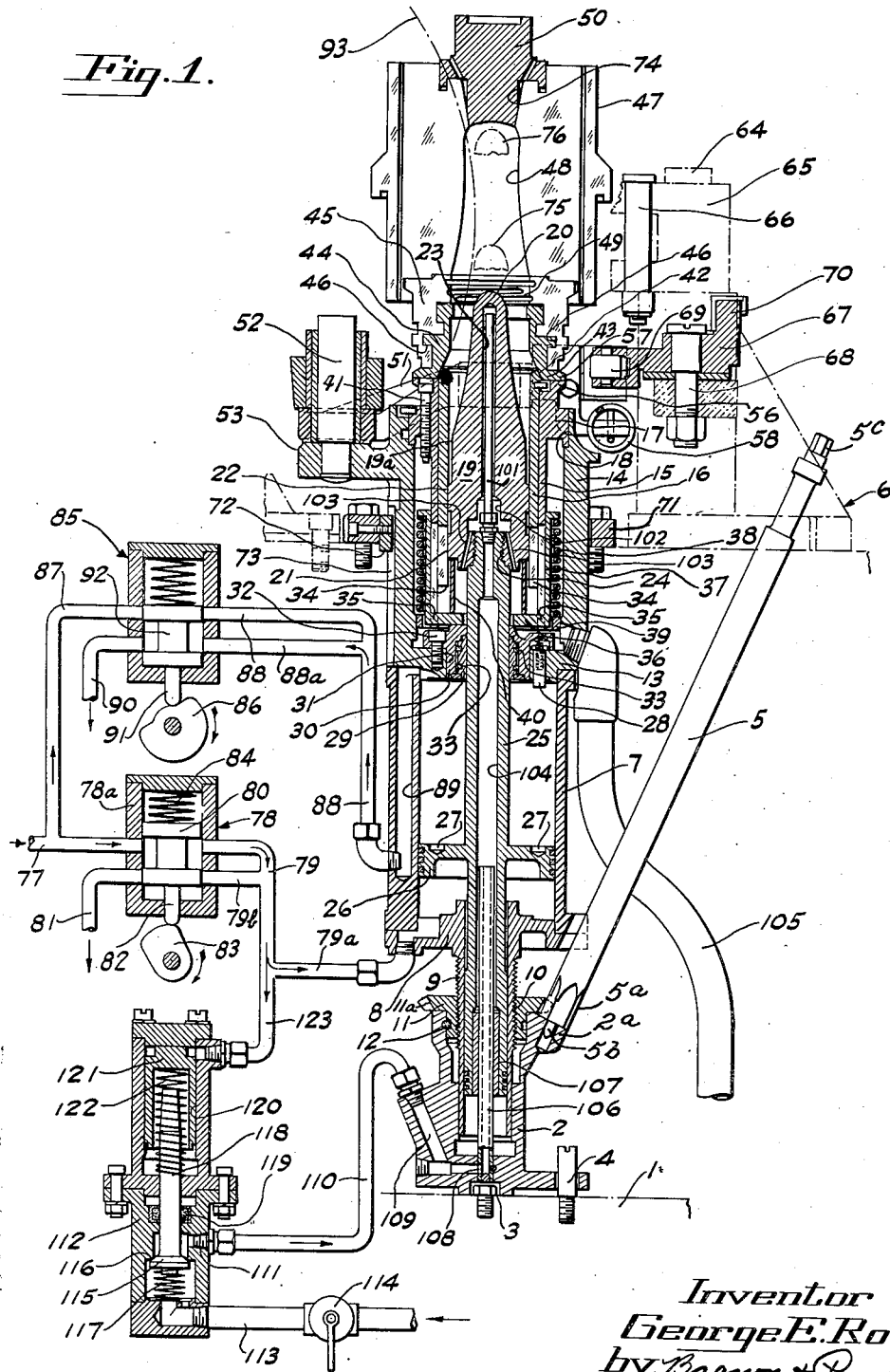

Figs. 7 to 12, inclusive, are fragmentary vertical sectional views which respectively show the respective positions of different relatively movable parts of the parison forming and plunger guiding, positioning and operating assembly, substantially as shown in the preceding views, at a number of different stages in the complete operation of forming a charge of molten glass into a hollow parison by the use of such assembly;

Fig. 13 is a view similar to Fig. 4 but showing a modified form of structure, the view showing the pressing plunger at the end of a pressing stroke thereof;

Fig. 14 is another view of the structure of Fig. 13, showing the relationship of the relatively movable parts thereof when the plunger is in its downwardly retracted position to permit removal of the neck mold and hollow parison for transfer and inversion of such parison, the view showing also by dot-and-dash lines the position of the tip of the plunger after it has been raised from such downwardly retracted position to a glass charge contacting position in the parison body press mold;

Fig. 15 is a fragmentary vertical sectional view of a modified form of structure which includes an adapter ring for use in converting the structure of Figs. 13 and 14 into a structure adapted to include and make use of a pressing plunger similar to that of the Fig. 1 form of structure;

Fig. 16 is a fragmentary vertical sectional view, showing a further modified form of cooperative neck mold and plunger guiding, positioning and operating mechanism, including a novel combination neck mold and neck thimble unit, the view showing the pressing plunger in its lowermost retracted position and such neck mold and thimble unit removed from the plunger guiding and positioning mechanism;

Fig. 17 is a view generally similar to Fig. 16 but showing the neck mold and thimble unit seated on the pressing plunger guiding, positioning and operating structure and the pressing plunger in its upwardly projected, pressing position within the press mold.

An assembly of parts provided in accordance with the present invention may rest upon a supporting base 1, Fig. 1, which may be the base of a complete glassware forming machine (not shown). A socket member 2 stands upon the base 1 and may be positioned and secured against displacement from the desired position thereon by any suitable means, as by the fastening devices indicated at 3 and 4, respectively.

A vertically disposed pneumatic cylinder 7 has a lower head portion 8 provided with a depending tubular axial extension 9 which depends into the vertical bore of the socket member 2. The tubular member 9 may be provided with external screw threads for engagement, as at 10, with the threaded wall of a central opening in an annular cover member or cap 11 which closes the upper part of the socket member 2 around tubular extension 9 and is retained in place in the socket member by suitable means, represented by the pin 12. The arrangement is such as to support the pneumatic cylinder 7 in vertical position at a height above the base 1 which can be adjusted vertically within limits. The vertical adjustment of the cylinder 7 may be effected by rotating an inclined rotary adjusting rod 5, Fig. 1, which has a toothed lower end portion 5a in mesh with an integral bevel gear portion 11a of the annular cover member or cap 11. The inclined rod 5 may have a reduced lower end portion 5b journaled in a bearing portion 2a of the socket member 2, and may extend through the frame structure, shown in dot-and-dash lines and indicated generally at 6, of the glassware forming machine. The extreme upper end portion of the rod may be made non-circular, as indicated at 5c, for engagement with a suitable tool (not shown) by which the rod 5 may be turned about its axis.

The pneumatic cylinder 7 is provided with a top head 13 which may also constitute the bottom part of an upstanding open-topped cylindrical holder 14. This holder is designed to accommodate various forms of pressing plunger guiding and positioning units. One such unit, as shown in Fig. 1, comprises a cylindrical plunger guide consisting of concentric outer and inner cylindrical members 15 and 16, respectively, the inner cylindrical member closely fitting within the outer. This plunger guide is disposed within the cylindrical holder 14 in concentric relation with the latter, as by the close fit of an externally enlarged upper portion 17 of the cylindrical guide with a counterbored upper end portion 18 of the cylindrical holder.

A pressing plunger 19 having a tapering tip 20 has its body enlarged at one or more places, as at 21 and 22, Fig. 1, to provide bearing surfaces in close sliding contact with the internal wall of the cylindrical plunger guide. This plunger is bored out at its center line at 23 from its butt end nearly to its tip, such bore being enlarged at the butt end and provided with screw threads at 24 for engagement with the reduced externally threaded upper end portion of a piston rod 25. The piston rod is carried by a piston 26 which fits slidably within the pneumatic cylinder 7 and is reciprocable in the latter to move the plunger vertically to the different positions required for carrying the present invention into effect, as hereinafter will be more particularly described.

The piston 26 is provided with a number of spaced open-topped sockets 27 in its top surface, arranged in a circle around the axis of the piston. A downwardly spring pressed detent or locking pin 28 is carried by the upper cylinder head 13 in position to enter and engage with any one of these sockets 27 when the piston has been forced completely to the upper end of the cylinder 7, whereby to lock the piston and piston rod to the cylinder head so that the plunger 19 can be grasped and turned manually to screw it onto the piston rod or to remove it for replacement by another pressing plunger when desired.

The piston rod 25 passes through a bearing member 29 located within a bearing casing 30 which fits within a central opening 31 in the cylinder head 13 and is secured in place in any suitable manner, as by cap screws such as that shown at 32. The bearing member 29 may have a slight lateral floating movement in any direction in relation to the bearing casing 30 but packing rings, as at 33, are provided between the bearing member 29 and its casing 30 to prevent leakage of pressure fluid through this bearing assembly. The purpose of this type of bearing structure for the piston rod is to permit slight relative lateral movement between the plunger supporting piston rod, piston and cylindrical piston guide, on the one hand, and the plunger supporting and operating structure, on the other, should such relative lateral movement be required to prevent binding or undesirable friction between adjacent relatively movable parts of the assembly when the plunger is reciprocated in accurately aligned relation with the cooperative molding parts of the associate parison forming unit.

The cylindrical plunger guide may depend within the cylindrical holder 14 to the floor of the latter in spaced relation with the inner side wall of such holder. The cylindrical plunger guide may be partially cut away or slotted vertically from the lower end thereof for part of its height, as indicated at 34 in Fig. 1, to provide clearance for radial ears 35 on a plunger lifting disk 36 which is disposed within the cylindrical holder 14 at the bottom of the latter. A spring pressed sleeve 37 surrounds the lower portion of the cylindrical plunger guide within the holder 14 and is integral with or joined in any other suitable manner to the ears 35 on the plunger lifting disk 36. A coil spring 38 surrounds the sleeve 37 between the flanged upper end of such sleeve and a stationary thrust ring 39 which is located in the bottom part of the cylindrical holder 14 around the lower end portion of the vertically slotted cylindrical plunger guide. A spacer ring 40 of a predetermined height is disposed within the cylindrical guide between the butt end of the plunger 19 and the disk 36.

A vertically adjustable stop screw 41 is threaded through the flanged upper portion of the cylindrical guide into the annular space between the holder 14 and such guide in the path of upward movement of the flanged upper end of the sleeve in the holder, for a purpose to be presently described.

The cylindrical plunger guide is provided at its top with a suitably configured annular seat 42, which may be obtusely angled in cross-sectional configuration as shown. A complementarily configured portion 43 of a thimble 44 is adapted to fit this seat accurately when a neck ring 45, by which such thimble is carried, is brought to an operative position with respect to the plunger guide. This neck mold may be formed of half sections, as is usual, such half sections being carried and operated by suitable holders, not shown, such for example as those of the Hartford-Empire I. S. forming machine, as disclosed in the Ingle patent, 1,911,119, granted May 23, 1933. The halves of the neck mold have internal horizontal grooves, as at 46, Fig. 1, into which a flange on the thimble projects sufficiently to allow the required opening and closing movements of the halves of the neck mold without release of the thimble from such neck mold halves.

The neck mold is designed to cooperate with a body mold 47 which, like the neck mold, may be formed of cooperative halves supported by suitable holders, not shown, and operated by suitable structural parts, also not shown, such, for example, as those provided for the blank mold halves of the Hartford-Empire I. S. machine as disclosed in the aforesaid Ingle Patent 1,911,119.

The body mold 47 is locked to the neck mold by the engagement of its halves with the neck mold when the body mold halves are closed about the closed neck mold and thus is aligned with the latter to provide in conjunction therewith a molding cavity 48 having the portion thereof that is located in the neck mold internally grooved, as at 49, to form a neck finish portion of the article that is to be made. The cavity within the body mold 47 is temporarily open at its top to permit downward passage of a charge of molten glass thereto, after which the molding cavity is closed at its top by a suitable bottom plate or closure member, indicated at 50. The latter may be supported and moved operatively in suitably timed relations with the movements of the other parts of the parison forming unit by structure such as is disclosed in the Ingle Patent, 1,911,119 for supporting and operating the blank mold bottom plate or baffle of the Hartford-Empire I. S. machine.

The bottom plate 50, the body mold 47 and the neck mold 45 will be secured together in alignment by their co-engaging portions, as is usual in the case of a glassware forming machine of the type disclosed in the Ingle patent. When the neck mold and thimble assembly is disposed upon the upper end of the plunger guide, as above described, accurate alignment of such assembly with the plunger guide and hence with the vertically reciprocable pressing plunger 19 in the latter may be secured and maintained by the use of suitable locking means, such, for example, as that hereinafter described.

*Locking means for the plunger guide and associate mold parts*

Means for aligning and locking together the aligned plunger guide and associate mold parts during formation of a charge into a hollow parison may comprise a pair of clamping levers 51, Fig. 2, which are pivotally mounted upon an upstanding stud or shaft 52 which is carried by a laterally extending bracket portion 53 of the cylindrical holder 14. The levers 51 are provided intermediate their ends at their inner sides with arcuate clamping jaws 54 having grooves 55 (one shown in Fig. 3) in the confronting faces thereof adapted to receive and closely engage and bias to aligned positions the superposed oppositely beveled flanged portions 56 and 57 of the plunger guide and the thimble 44, respectively, if these parts should not already be aligned at the time they are engaged by said jaws. A heavy coil spring 58, Figs. 1 and 2, connects the free ends of the levers 51 and is under tension sufficient to pull them toward each other so as to tend to maintain the jaws 54 in locking engagement with the flanged portions 56 and 57 of the plunger guide and the thimble 44, whereby to maintain the thimble and the plunger guide in axial alignment with each other. The closing of the relatively heavy body mold halves in embracing engagement with the closed neck mold will determine the exact position of the latter at the pressing station. The thimble and hence the neck mold is locked in alignment with the plunger guide. The plunger guide and the reciprocable plunger, being maintained in alignment with the neck mold, may likewise be displaced slightly in a lateral direction if required by the closing of the body mold halves about the neck mold. These connected parts will be axially aligned when they are in their assembled positions, as shown in Fig. 1, for example.

The jaws 54 may be releasably attached to the levers 51 so that they may be removed and replaced by other suitably shaped jaws when different plunger guiding and molding units are employed. As shown in Fig. 3, each jaw 54 has a stud 59 extending through an oversized opening 60 in its supporting clamping lever 51. A suitable releasable fastening means, such as the washer 61, a spring 62 and the nut 63 on the stud 59 may be employed to maintain the jaw 54 attached to its lever 51 and to permit it to pivot or move universally against a curved bearing surface at 54a to assure operative engagement of the jaw with the parts which are to be aligned and locked together by such engagement.

It is necessary to open the jaws 54 to permit removal of the neck mold for transfer of the parison at an appropriate time in the cycle of glassware forming operation. The supporting frame structure 6 may be provided at appropriate places with short vertical shafts 64, Figs. 1 and 2, carrying crank arms 65 provided with actuating pins 66 for engaging and actuating releasing levers 67. The shafts 64 may be actuated by any suitable means (not shown) to swing the crank arms 65 carried thereby about the axes of such shafts. The releasing levers 67 are pivoted intermediate their ends on vertical pivot elements 68 so that rollers 69 on the inner ends of these levers bear against the inner faces of the free ends of the clamping levers 51 while the opposite ends of the releasing levers lie in the paths of movement of the pins 66 on the crank arms 65. Thus, when the pins 66 are moved by their crank arms 65 from the full line positions of Fig. 2 to the dotted line positions of the same view, these pins will engage the outwardly turned outer end portions 70 of the releasing levers and will move them to the dotted line positions indicated in Fig. 2, thereby actuating the releasing levers to force the clamping levers 51 away from each other sufficiently to release the neck mold halves so that such halves may be moved bodily with the thimble carried thereby in a generally vertical direction.

The holder 14 of the plunger guiding, positioning and operating mechanism may extend through a horizontal stationary frame ring 71, Fig. 1, which may be sufficiently large internally to provide a slight clearance space between it and such holder. A key 72 removably carried by the ring 71 projects into a vertical keyway 73 in one side of the holder and cooperates with the latter to retain the holder and the connected parts against accidental or unintended rotary movements while permitting vertical adjustment thereof. The key may be removed to permit disassembly of the connected parts of the plunger guiding, positioning and operating mechanism.

The cavity of the body mold is shaped in relation to the shape of the tapering tip portion of the pressing plunger and the dimensions of these parts and of the glass molding space within the neck mold are predetermined and selected with relation to one another to form a glass charge of a predetermined size into a hollow parison having definite internal and external configurations. Preferably, the cavity of the body mold is slightly constricted at a predetermined level between the upper and lower ends thereof so as to flare somewhat in both upward and downward directions from this place of restriction. The bottom plate or baffle receiving portion of the body mold, above the cavity 48, may be upwardly enlarged, as indicated at 74 in Fig. 1, to serve as a funnel for guiding a charge axially downwardly into the glass forming cavity of the body mold. The configuration of the cavity of the body mold cooperates with the tapering tipped plunger to assure symmetrical distribution of the glass of the charge in the mold cavity at the time of contact of the lower end of the charge with the tip of the plunger at the charge contacting position indicated at 75 in Fig. 1, and thereafter as the plunger is moved upwardly on its pressing stroke to a pressing position, indicated at 76 in Fig. 1.

*Plunger operating provisions*

The upward movement of the plunger from its charge contacting position 75 for a pressing stroke thereof is effected by admitting air or other fluid under pressure to the cylinder 7 below the piston 26 therein. This operating pressure fluid may be supplied from a supply line 77 through a valve 78, a pressure fluid delivery pipe 79, and a branch delivery pipe 79a, the latter communicating with the interior of the cylinder 7 at the bottom of the latter. The valve 78 is shown in Fig. 1 as comprising a casing 78a in which is disposed a slide valve 80 constructed and arranged to provide communication between the pressure fluid supply line 77 and the pressure fluid delivery pipe 79 and to shut off communication between an exhaust line 81 and a pressure fluid return pipe 79b when the valve member 80 is in one position in the valve casing. The valve member 80 will provide communication between the return pipe 79b and the exhaust line 81 and will shut off communication between the line 77 and the pressure fluid delivery line 79 when such valve member is in another position in the valve casing. A valve stem 82 projects from one end of the valve casing onto a cam 83, against which it is pressed by a spring 84 located between the valve member 80 and the opposite end of the valve casing. When the stem 82 is on the high part of the cam 83, as shown, the valve member 80 is in its first named position in the casing 78 and when the stem 82 is on the low part of the cam, the valve 80 will be in its second position in the casing.

The valve structure shown in Fig. 1 and as described is intended to represent any suitable valve structure and its operating mechanism. In actual practice, the valve controlling the supply and exhaust of air or other pressure fluid to and from the lower part of the cylinder 7 and operating mechanism therefor preferably would be similar to those which are included in the Hartford-Empire I. S. forming machine and are disclosed in the aforesaid Ingle Patent 1,911,119.

A valve 85 is shown in Fig. 1 as being similar in construction and mode of operation to the valve 78 and as controlled by a cam 86. This valve 85 is operatively connected with a branch 87 of the pressure fluid supply line 77. At its side opposite its conection with the pipe 87, the valve 85 is connected by a pressure fluid delivery pipe 88 with a passage 89 in the wall of the cylinder 7. This passage communicates with the interior of the cylinder 7 at the upper end of the latter, above the piston 26. A pressure fluid return branch 88a of the pipe 88 communicates with the valve 85 at one side thereof. An exhaust pipe 90 communicates with the valve 85 at a place opposite the connection of such valve with the pipe 88a. The arrangement is such that pressure fluid will pass from the line 87 through the valve 85 to the pipe 88 and the passage 89 to the upper end of the cylinder 7 when the stem 91 of a spring pressed valve member 92 in the valve 85 is on the high part of the cam 86. Exhaust of pressure fluid from the upper part of the cylinder 7 through part of the line 88, return line 88a, valve 85 and exhaust line 90 will take place when the stem 91 is on the low part of the cam 86. As in the case of the valve 78, the valve 85 and its operating mechanism are representative of any suitable structure, such, for example, as that which is included in the Hartford-Empire I. S. forming machine as disclosed in the Ingle Patent 1,911,119.

The pressure fluid actuated downward stroke of the piston 26 may be such as to retract the pressing plunger from its uppermost or pressing position past the charge receiving position 75 to a still lower position, which may be termed the neck-mold clearance position of the plunger and which may be the position shown for the plunger in Fig. 1. When the plunger reaches its charge receiving position 75 during its downstroke, its butt end will contact with the upper edge of the spacer ring 40 which rests upon the plunger lifting washer or disk 36. The latter is held at this time in an elevated position by the action of the spring 38 which has forced the sleeve 37 upwardly until its flanged upper end is in contact with the adjustable stop screw 41. The further downward movement of the plunger in response to the actuation of the piston 26 by the pressure fluid in the upper part of the cylinder 7 will move the plunger lifting disk 36 and its connected sleeve 37 downwardly against the resistance of the spring 38, which is thereby compressed, until these parts reach the positions shown by the full lines in Fig. 1. This, as aforesaid, is the position of the plunger at which ample clearance is provided for bodily movement of the neck mold from the plunger guide to transfer the hollow parison to a laterally spaced station for further shape forming treatment or for any other useful purpose. This neck mold clearance position of the plunger may be adjusted vertically by the selective use of spacer rings 40 of different heights. The parison transfer movement of the neck mold may be a bodily swinging movement thereof along an arcuate path indicated at 93 in Fig. 1.

As soon as the pressure within the cylinder 7 above the piston 26 is relieved, the spring 38 may act to lift the disk 36 through the connection of the sleeve 37 with such disk, thereby raising the disk 36, the spacer 40 and the plunger 19 as a unit until the sleeve strikes the stop screw 41. This will dispose the tip of the plunger in its glass charge receiving position 75, as aforesaid. This position of the plunger is that at which the plunger initially contacts the glass charge when the mold is charged or loaded. Such position may be adjusted by the selective use of stop screws 41 of different lengths, particularly if, as indicated by the showing of Fig. 1, difficulty might be encountered in providing necessary clearance space for the head of a stop screw of adequate length to take care of all possible adjustments of the level of the charge receiving position of the plunger.

The limit of the pressing stroke of the plunger is determined by the glass of the charge as such glass is pressed to form the hollow body of the shape desired. The external configuration of this hollow body is fixed by the configuration of the glass molding walls of the cavity of the assembled body mold 47, baffle 50, neck mold 45 and thimble 44. The internal configuration of the hollow glass body will be determined by the shape of the portion of the pressing plunger in contact with the glass at the end of the pressing stroke.

Any variation in the weight of the charge from the exact weight desired is reflected in the thickness of the wall of the hollow article. It is desirable that the charges shall be of exactly the predetermined weight desired but in actual practice it may not be possible to continuously maintain this desirable condition and slight weight variations are permissible. The position of the plunger at the end of its pressing strokes may vary slightly according to variations in weight of the charges that have been pressed. To aid in providing a suitable arrangement and assembly of parts to assure correct positioning of the plunger at the end of a pressing stroke when the charge is of the exact weight desired, the invention provides a plunger position indicating means, an example which will now be described.

*Plunger position indicating means*

As shown in Fig. 5, a wall of the cylindrical holder 14 is provided with a vertical slideway 94 in which a vertically movable indicator rod 95 is slidably disposed. This indicator rod 95 has its lower end portion bent laterally at 95a and then downwardly at 95b within a small chamber 96 which provides communication between the lower end of the guideway 94 and the interior of the cylinder 7 at the upper end of the latter. The upper end portion of the indicator rod 95 is reduced in size as indicated at 97 and extends through a closely fitting vertical opening 98 at the upper end of the guideway 94 into the vertical stem portion 99 of an indicator slot that is substantially T-shape and has a horizontal upper or head portion 100. When the charge is of the exact weight desired and the dimensions and relative arrangements of the parts of the apparatus are correct, the upward movement of the piston 26 to effect a pressing stroke of the plunger 19 to press that charge into the hollow parison desired will cause a sufficient lifting of the indicator rod 95 by the contact of the piston 26 with the laterally offset lower end of the rod during the final part of the upward movement of the piston to dispose the upper end of the indicator rod exactly flush with the lower side of the horizontal head 100 of the T-shaped indicator slot at the time the plunger completes its pressing stroke, substantially as shown in Fig. 6. Should the indicator rod vary either in an upward or downward direction from this position, the operator will be apprised of a possible need of a slightly different-sized plunger or of some other slight structural change in the assembly of parts, assuming that the weight of the charge has been checked and found to be substantially correct. The operator thus will be aided, particularly at the start of operations, in locating and correcting any slight error in the structural assembly to be employed in such operations. Preferably, the dimensions of the plunger and the construction and arrangement of its supporting and operating mechanism are such that a straight sided portion 19a (Fig. 1) of the plunger will project a slight distance, say $\frac{1}{16}$", above the upper edge of the thimble opening when the plunger is at the upper end of a stroke to press a charge of the exact weight desired and the proportions and relationships of the parts of the structural assembly are correct. This will allow for slight variations in position of the plunger at the end of pressing strokes because of slight variations in the weight of charges without harmfully affecting the formation of the neck finish portions of the pressed parisons. A coil spring 95c may be provided in the slideway 94 around a portion of the rod 95 to act on the latter to return it to its "down" position and to stabilize the upward indicating movement thereof.

*Plunger cooling provisions*

Efficient formation of successive charges into hollow glass parisons will be aided if the glass contacting portion of the plunger is maintained at a temperature which is most suitable for the purpose and which is as nearly uniform throughout the glass contacting surface of the plunger as can be obtained. The invention provides a novel means for and a novel way of cooling the plunger internally, by which such temperature can be effectively regulated and controlled.

As shown in Fig. 1, a liquid discharge pipe 101 is provided in the bore of the plunger and extends from the lower part of said plunger nearly to the tip of the latter in slightly spaced relation with the wall of the plunger bore. The lower part of the plunger bore may be enlarged at 102 to provide a drainage chamber which has inclined drainage passages 103 in the butt end of the plunger around the connected end portion of the piston rod. The discharge pipe 101 may be threaded into the bore of the piston rod, the latter being hollow as indicated at 104. The drainage passages 103 discharge into the interior of the cylindrical plunger guide so that liquid discharged from these passages 103 may pass to the bottom part of the cylindrical holder, from which they may be drained by a final drain pipe 105. The latter may lead to any suitable place at which the liquid is to be delivered.

A stationary pipe 106 extends upwardly from the socket 2 through a packing 107 in the lower part of the tubular extension 9 below the cylinder head 8 into the bore of the reciprocable piston rod, such tube 106 being closed at its lower end by contact with the bottom wall of the socket member 2 or in any other suitable manner. A lateral intake port 108 in the tube 106 communicates with a liquid supply passage 109 in the socket member 2. A liquid delivery pipe 110 is connected with the socket 2 in communication with the passage 109. The pipe 110 leads from the delivery port 111 of a cooling liquid control valve 112. A cooling liquid supply line 113 is connected with the valve 112 and includes a flow regulator 114.

The valve 112 includes a movable valve member 115 cooperative with a valve seat 116 in the valve to permit or prevent communication between the supply line 113 and the delivery port 111, according to the position of the valve member 115. A spring 117 tends to maintain the valve member 115 on its seat so as to shut off communication between the lines 113 and 110. The valve member 115 has a stem 118 extending through a packing 119 into a chamber 120 in which a piston 121 is slidably disposed and is normally maintained by a spring 122 at the end of the chamber 120 away from the valve stem 118. Air under pressure may be admitted to the chamber 120 at the side of the piston 121 opposite the valve stem to move the piston longitudinally of the chamber 120 sufficiently to contact and move the valve stem 118 as required to open communication between the lines 113 and 110. This actuation of the piston 121 preferably is effected simultaneously with each upward or pressing movement of the plunger, as by air passing to the chamber 120 from a branch 123 of the air supply line 79 at the time the valve 78 is actuated to supply air to the cylinder 7 beneath the piston 26.

The plunger cooling means just described may be used to supply a regulated quota of cooling liquid, such as water, to the interior of the plunger at each pressing stroke of the plunger. Liquid may drain from the plunger through the continuously open drainage passages in the lower end portion of the upright plunger. The amount of the intermittently delivered quotas of cooling liquid may be regulated by the regulator 114 in the water line 113. It has been found in actual practice that this mode of cooling permits a relatively wide range and effective control of the temperature of the glass contacting portion of the plunger. The cooling arrangement and mode of use also make the cooling passages of the plunger self-cleaning.

*Air for "puff blowing" and other uses.*

The improved plunger operating mechanism of the present invention also includes means for supplying air under pressure to the interior of the forming unit or to the interior of the hollow glass parison therein, if desired. As shown in Fig. 4, an air supply passage 124 is formed in a wall of the cylinder 7 in communication with a passage 125 in the wall of the cylindrical holder 14. At its upper end, the passage 125 communicates through an annular passage 126 in the inner periphery of the holder 114 with inclined passages 127 in the cylindrical plunger guide. These passages 127 are in open communication at their upper ends with the space within the thimble 44. Air may be supplied to the passage 124 and thence to the communicating passages referred to at an appropriate time from an air delivery line 128 under the control of a valve 129. The latter may be actuated by a cam 130, as in the case of the valves 78 and 85 shown in Fig. 1, so that air from a source of supply, indicated by the line 131, may pass through the valve 129 to the line 128 and thence to the passage 124 when the stem 132 of a valve member (not shown) in the valve 129 is on a certain portion of the cam 130. Communication between the lines 131 and 128 will be shut off by the valve 129 when the stem 132 is on a different portion of the cam. If desired, provisions similar to those shown for the valves 78 and 85 may be made for exhausting air from the communicating passages 124, 125, etc. In actual practice, the valve controlling the supply of air to and through the passages 124, 125, etc., preferably would be constructed and controlled as disclosed in the aforesaid Ingle Patent 1,911,119. The valve structure shown in Fig. 4 is intended to represent any suitable valve structure for controlling the supply of air under pressure for "puff" blowing of parisons that have been formed in the forming unit or for any other useful purpose.

In practice, it may be desirable to apply air through the provisions just described to the hollow parison at or immediately after the withdrawal of the plunger to prevent sticking of any portion of the glass to the plunger, to prevent collapse of any portion of the glass body or even to expand such body slightly.

*Parison forming operations by use of structure substantially as so far described*

Figures 7 to 12, inclusive, illustrate such a structure as different component parts thereof appear at a number of different stages in a complete cycle of operations. The parts of the assembly shown in Figs. 7 to 12, inclusive, are indicated by the reference numerals hereinbefore used when they are identical in all respects with parts that have been hereinbefore described and identified by such reference numerals. The same reference numerals primed are applied to parts of the assembly of each of Figs. 7 to 12, inclusive, when they are the same in structure and function with parts previously described and identified by such reference numerals but differ slightly in appearance or immaterial details from the latter.

Referring to Fig. 7, the plunger 19 is in its lowermost or neck-mold clearance position. The neck mold 45', and the thimble 44' within such neck mold are moving toward positions to seat the thimble on the seat 42' at the top of the cylindrical plunger guide. At this time, the spring pressed sleeve 37' is at the lower end of its path of vertical movements and the spring 38' is compressed. The body mold halves are open.

In Fig. 8, a charge 133 is descending axially through the funnel portion 74 of the body mold 47 toward the underlying cavity of such mold, the latter being closed around the neck mold 45' which in turn is closed around the thimble 44', the latter being now located upon the seat 42' at the top of the cylindrical plunger guide. The plunger 19 is in its glass charge receiving position, in which it projects through the neck mold to a predetermined level above the glass engaging or internally grooved portion of such neck mold.

Fig. 9 shows the charge 133 supported as an entity upon the tip of the plunger 19 within the constricted intermediate portion of the body mold cavity and below the lower or glass forming surface of the bottom baffle 50, which is now in its seated position in the upper part of the body mold. It will be noted that the glass charge is symmetrically disposed with relation to the molding walls of the cavity of the body mold and with relation to the space surrounding the plunger between the latter and the wall of the cavity of the neck mold. All the glass in the charge is supported above the glass engaging grooves of the neck mold and the descent or downward movement of the charge as an entity has been checked by the supporting contact of the plunger tip with glass of the charge at the axis of such charge. The glass of the charge may shift or creep downwardly on the plunger tip at the peripheral portion of the charge and relatively to all external heat-extracting or glass chilling surfaces. The molding parts and the plunger guide are locked together in aligned relation by the clamping jaws indicated in dot-and-dash lines at 54'.

Fig. 10 shows the plunger at the end of its upward or pressing stroke by which part of the glass of the charge has been pressed between the plunger and the wall of the cavity in the body mold and the remainder of the glass of the charge has been forced downwardly into the neck mold to form a neck finish portion at the lower end of an inverted hollow glass parison, designated 134.

At the stage of operation shown in Fig. 11, the halves of the body mold may have been opened slightly or "cracked," the bottom baffle has been removed and is not shown. Air under pressure is being applied, by "puff blowing" or otherwise to the interior of the hollow parison, now designated 135, to slightly expand or develop the latter or to prevent sagging of any portion thereof. The pressing plunger has been retracted to its lowermost, neck mold clearance, parison transfer permitting position.

Fig. 12 shows the neck mold and thimble unit and the parison supported thereby during the course of their movements away from the plunger guiding, positioning and operating mechanism to effect transfer and reversion of the parison. The halves of the body mold are now wide open. The plunger and the parts of its guiding, positioning and operating mechanism are now in the same positions as at the stage of operations shown in Fig. 7.

The hollow parison thus formed may be further expanded, as in a blow mold (not shown), into a glass container of the final shape desired, as by the means and in the way disclosed in my aforesaid Patent No. 2,289,046 of July 7, 1942, or in any other suitable way. It is obvious that the configuration of the molding parts operated substantially as just described may be such as to adapt the pressed hollow glass body for some particular use in the form that it has at the end of the pressing operation. In that event, such article may be given further treatment, such as annealing, tempering or the like, and used for the purpose intended without further expansion.

The hollow glass parison shown as having been formed by the operations just described is suitable for further expansion to provide a glass jar.

*Structural modifications of Figs. 13, 14 and 15*

A modified form of structure that is particularly suitable for use to form a glass charge into a parison suitable for further fabrication to provide a milk bottle is shown in Figs. 13 and 14. The cylinder 7 supports an open-topped cylindrical holder 214 having an upper portion different from that of the holder 14. The plunger guiding unit includes a cylindrical casing 136 disposed within the holder 214 and secured in place, as by fastening devices represented by the cap screw 137. A thimble carrying cylindrical plunger guide 138 is vertically reciprocable in the casing 136 and projects upwardly from the latter through a closure ring 139 which is threaded into the upper end portion of the cylindrical casing 136. The cylindrical member 138 has a portion enlarged at 140 and provided with piston rings 141 so as to have a close sliding fit with the cylindrical casing 136. The lower portion of the cylindrical member 138, beneath the piston portion 140, depends into a stationary cylindrical guide 142, which has an external flange 149 at its lower end portion fastened at 143 to an internal flange 144 on the lower end of the cylindrical casing 136. The lower portion of the cylindrical member 138 is provided with piston rings 145 on the portion thereof within the member 142 so as to have a fluid-tight sliding fit with the latter. A spacer 146 is disposed upon an internal shoulder 147 on the lower portion of the cylindrical member 138. A coil spring 148 surrounds the telescopically related portions of the members 138 and 142 and reacts at its upper end against the piston portion 140 of the former and at its lower end against the flange 149 at the lower end of the latter.

The member 138 carries a thimble 244 which is held in place thereon by a split coupling, one half of which is indicated at 150. A suitable plunger 219, having a shape and dimensions different from those of the previously described plunger 19, is secured to the upper end portion of the piston rod 25. An annular seating plate or ring 151 is mounted within and carried by the neck mold 245. This neck mold is formed in halves which may be supported and operated as previously described. When these halves have been closed and the neck mold has been brought to its molding position as shown in Figs. 13 and 14, it and the seating ring 151 will be in positions to encompass the thimble 244 and the connected portion of the thimble carrier 138 when these latter parts have been raised to the positions shown in Fig. 13. Axial alignment of these co-operative co-engaging parts may be secured by the mating fit at 152, Fig. 13, of the lower portion of the seating ring 151 with an annular seat at the upper surface of the ring 139. Locking means, such as previously described, may be used to clamp these mating parts together. This, as will be apparent, will maintain the plunger, thimble and neck mold in axial alignment with one another.

In Fig. 13, the plunger 219 is shown as being in its uppermost or pressing position in the body mold 247. In Fig. 14, the plunger 219 has been retracted downwardly past a charge receiving position, indicated by the dot-and-dash lines at 275, to a lowermost or neck mold clearance, parison inversion permitting position. The latter part of the downward stroke of the piston 219 has caused downward movement of the cylindrical member 138 and retraction of the thimble 244. The positions of the parts of the device as shown in Fig. 14 are such that the neck mold 245 may be raised, after the halves of the body mold have been opened, to transfer the parison and to revert it substantially as hereinbefore described. At an appropriate time thereafter, pressure in the upper part of the cylinder 7 may be relieved and the compressed spring 148 will then be effective to raise the member 138 and the thimble thereon to the positions shown in Fig. 13 and the plunger to the position indicated at 275 in Fig. 14.

The air supply provisions of the form of structure now being described are slightly different from those previously described. The air passage 124 in the wall of the cylinder 7 communicates with a passage 225 in the holder 214. The passage 225 is open at the upper end of the holder 214 but is covered by an outwardly enlarged cap portion 153 of the cylindrical casing 136. A passage 154 in the part 153 communicates through a downwardly inclined passage 154a with the interior of the cylindrical casing 136 beneath the piston portion 140 of the member 138 when the latter is in its raised position. Thus, when the parts are in the position shown in Fig. 13, air may be applied beneath the piston portion 140 to maintain the thimble 244 firmly in contact with the overlying portion of the neck mold and in cooperative molding relation with the latter. When the parts are in the positions shown in Fig. 14, air supplied through the passages above enumerated may pass to the interior of the cylindrical casing 136 above the piston portion 140 of the member 138, thence through passages 155 to the interior of the thimble and thence past the plunger to the interior of the hollow parison (not shown) which at this stage of operations will be supported in inverted position by the neck mold.

Fig. 15 illustrates use of the holder 214 with the plunger guiding, positioning and operating unit and the plunger of the Fig. 1 form of construction. Since the holder 214 is shorter than and differs in construction at its upper end from the holder 14 of the Fig. 1 form of structure, an adapter ring 156 is provided to cover the upper end of the holder 214. The adapter ring 156 is provided with an open-bottomed air chamber or passage 157 in communication with the air passage 225 in the holder 214. From the passage 157, air may pass through ports 157a to the passages 127 in the upper portion of the cylindrical plunger guide within the holder 214.

*The modified form of structure of Figs. 16 and 17*

In a modified form of structure shown in part in Figs. 16 and 17, a neck mold 345 carries a thimble 344 which is mounted in the halves of such neck mold for limited axial movement relative to the latter. A flange 346 is secured to the lower end of the cylindrical body 347 of the thimble, as by the lock ring 348. A coil spring 349 encircles the thimble so as to be compressed between the flange 346 and a thrust ring 350 which has an external flange 351 projecting into grooves 352 in the halves of the neck mold. The spring 349 exerts pressure on the flange 346 so as to tend to push the thimble 344 out of the neck mold. The extent of the spring-actuated movement of the thimble relative to the neck mold is slight, however, being limited by the contact of an external shoulder 353 on the thimble with the thrust ring 350.

The neck mold and thimble unit just described may be used with beneficial results in an assembly which includes a pressing plunger, a neck mold and a thimble all suitably formed and shaped to form the neck finish portion of a milk bottle parison as the concluding part of a parison forming operation, substantially as hereinbefore described. Such a plunger is designated 219 in Figs. 16 and 17, as in the case of the like plunger in Figs. 13 and 14. The plunger guiding, positioning and operating mechanism of the form of structure partially shown in Figs. 16 and 17 may, however, be the same in essential respects as the corresponding mechanism of the Fig. 1 form of structure, differing from the latter mainly in the width of the spacer on the plunger lifting disk 36. This spacer is designated 340 in Fig. 17. Other parts of the structure shown in Figs. 16 and 17 which are identical or substantially identical with parts shown also in Fig. 1 have been indicated by the same reference numerals in all these views and therefore need not now be further described.

After formation of a charge into a parison suitable for further fabrication to provide a milk bottle, the plunger will be retracted downwardly from its pressing position, indicated in Fig. 17, past its charge receiving or "loading" position to a still lower neck mold clearance position, as in the operations of the previously described forms of structure. The transfer and reversion of the parison may be effected by bodily swinging movement of the neck mold and thimble unit and the parison along the arcuate path 93 as previously described. At the beginning of this transfer movement, the neck mold will be moved relative to the thimble, because of the action of the compressed spring 349, until the matrix portion 345a of the neck mold and the neck finish portion of the glass parison therein (not shown) have been separated from the matrix portion 344a of the thimble. Thereafter, these parts will be moved in unison. See Fig. 16. The purpose of effecting this separation of the thimble from the neck mold at the beginning of the parison-transferring movement of the neck mold is to assure clean separation of the neck mold halves from the neck finish portion of the parison when such halves subsequently are opened to release the parison. A milk bottle or other similar parison has glass of substantial mass in the neck finish portion thereof. The matrix portions of the neck mold and associate thimble may be heated by heat from the neck finish portions of successive milk bottle parisons to such an extent that in time there is danger that the glass of the neck finish portion of the parison may stick to the neck mold when the halves thereof are opened to release the parison. Separation of the thimble from the neck mold to the extent indicated at the beginning of the transfer movement tends to obviate this undesirable condition.

It of course will be understood that all of the modified forms of structure herein described may be provided with the several improvement features of the present invention which have been pointed out in the description of the form of structure shown in Fig. 1 and of the mode of operation thereof to form a charge of molten glass into a hollow glass parison. The invention is not limited to the exact details of the structures shown in the drawings and hereinbefore specifically described as various modifications thereof and changes therein will readily occur to those skilled in the art.

What I claim is:

1. In glassware forming apparatus, the combination with an inverted press mold open at its lower end and located at a glass charge pressing station, of a pressing plunger tapering externally toward its tip for part of the length thereof, and means for guiding, positioning and operating said plunger to dispose it in axial alignment with said inverted press mold with its tip uppermost and to move it upwardly from a lowermost, mold clearance position to said tip to a higher initial glass charge contacting and supporting position within said press mold, thence to a still higher position within the press mold to press the glass of the charge on the plunger tip against the internal walls of the press mold to form a hollow body, said plunger being of sufficient length to extend upwardly within the inverted press mold from the lower end of the latter for the greater part of the length of the cavity of said mold when the plunger is at its glass pressing position in said press mold, and finally downward past said second named position to said lowermost, mold clearance position, said means comprising a pressure fluid motor operatively connected to said plunger, means for operating said pressure fluid motor to move said plunger from said initial glass charge contacting and supporting position upwardly to said still higher position within the press mold and thereafter downwardly completely to said lowermost, mold clearance position, and means rendered effective by the downward movement of the plunger to said lowermost, mold clearance position to move said plunger upwardly to said initial glass charge contacting and supporting position.

2. In glassware forming apparatus, the combination with an inverted press mold assembly comprising an inverted body mold open at its upper and lower ends, an inverted neck mold at the lower end of the body mold in cooperation therewith, a bottom baffle for closing the body mold at its upper end, said parts of said inverted press mold being separately movable and said neck mold being adapted to be moved in a generally upward direction along an arc of a circle when said body mold is out of the way to transfer a hollow glass body supported by said neck mold from said pressing station to a laterally spaced station at which said hollow glass body is to be given further treatment or handling, of a plunger tapering externally toward its tip for part of the length thereof, means for supporting said plunger in vertical position with the tip uppermost for movement along a vertical path in co-axial relation with said inverted press mold, means for moving said plunger upwardly along said path from a lowermost, mold clearance position at which the tip of the plunger will be disposed at a sufficiently low level in relation to said neck mold to permit said hollow glass body transferring movement of the neck mold from said pressing station to said second-named station to a higher, glass charge initial contact position at which the tip of the plunger will be located within the body mold at a sufficiently high level to support the glass of a charge within said body mold completely above the glass forming portion of the neck mold, a pressure fluid motor operatively connected to said plunger, and means for operating said pressure fluid motor to move said plunger from said second named position upwardly within the body mold to a glass charge pressing position and thence downwardly past said glass charge initial contact position to the lowermost, neck mold clearance position of said plunger, said plunger being of sufficient length to extend upwardly within the inverted press mold assembly through said neck mold nearly to the upper end of the cavity of the body mold when said plunger is at its said glass charge pressing position.

3. In glassware forming apparatus, the combination with an inverted press mold located at a glass charge pressing station and open at its lower end, of a pressing plunger, pneumatically operated means operatively connected to said plunger to move it vertically in co-axial relation with said press mold from a mold charge initial contact position in said press mold to a higher charge pressing position therein and thence downwardly past said initial contact position to a still lower, mold clearance position, said plunger being of sufficient length to extend upwardly within said inverted press mold from the lower end of the latter nearly to the upper end of the interior thereof when said plunger is at its said glass pressing position, and other means acting automatically after each downward movement of the plunger by said pneumatically operated means to said mold clearance position to move said plunger upward to its said glass charge initial contact position.

4. In glassware forming apparatus, the combination with an inverted glass mold located at a glass charge pressing station and open at its lower end, of a pressing plunger, pneumatically operated means operatively connected to said plunger to move it vertically in co-axial relation with said press mold from a mold charge initial contact position in said press mold to a higher charge pressing position therein and thence downwardly past said initial contact position to a still lower mold clearance position, other means acting automatically after each downward movement of the plunger by said pneumatically operated means to said mold clearance position to move said plunger upward to its said mold charge initial contact position, and means for adjustably limiting the extent of upward movement of said plunger from said mold clearance position by said other means to adjustably control the level within the press mold at which the upper end of said plunger will be located when said plunger has been raised to its said glass charge initial contact position.

5. In glassware forming apparatus, the combination with an inverted press mold open at its lower end, of a pressing plunger, means for supporting said plunger in vertical position in coaxial relation with said press mold for vertical reciprocations, means for operating said plunger to cause an upward glass charge pressing stroke thereof to a pressing position within the press mold periodically and a downward return stroke after each pressing stroke, said plunger having an internal axially extending cooling space provided with a continuously open drainage passage at its lower end, and intermittently acting means for introducing a predetermined amount of cooling liquid into said cooling space in the plunger during each pressing stroke of said plunger and for preventing introduction of further cooling liquid into said cooling space during each downward return stroke of the plunger.

6. In glassware forming apparatus, a pressing plunger tapering externally toward its tip for part of the length thereof, means for supporting said plunger in vertical position with the tip uppermost for reciprocation vertically between a lower position and a higher pressing position, said plunger having an axially extending internal cooling space provided at its bottom with a continuously open drainage passage, an open topped cooling liquid discharge tube extending within said cooling space to a level near the upper end of said space, means for reciprocating said plunger vertically between its said positions, and means operatively connected with the means for reciprocating said plunger automatically to supply regulated amounts of cooling liquid to said cooling liquid discharge tube during each upward movement of the plunger and to prevent passage of cooling liquid to the discharge tube during each downward movement of said plunger.

7. In glassware pressing apparatus, a pressing plunger, a pneumatic cylinder disposed in vertical position, an open lower ended press mold located at an overhead pressing station in axial alignment with said cylinder, a piston reciprocable in said cylinder, a piston rod projecting upwardly from said cylinder and supporting said plunger in approximately axial alignment with the cylinder, means for supplying and exhausting air under pressure to and from the opposite ends of the cylinder to cause reciprocation of said piston in said cylinder, an open topped cylindrical holder supported by said cylinder and surrounding said plunger in substantially concentric relation therewith, and plunger guiding and positioning means disposed within said holder, said guiding and positioning means including a cylindrical guide surrounding the plunger, a sleeve reciprocable vertically on said guide, a coil spring acting when compressed to urge said sleeve upward within said holder, a vertically adjustable stop member for limiting the upward movement of said sleeve in said holder, and a vertically movable plunger lifting disk surrounding said piston rod within said holder beneath said plunger and rigidly connected with said vertically movable sleeve to cause compression of the spring on downward movement of said plunger to its lowermost position and lifting of the plunger from said lowermost position on exhaust of air from the upper part of said pneumatic cylinder.

8. In glassware forming apparatus, the combination with an inverted press mold comprising a body mold and a neck mold at the lower end of the body mold, a pressing plunger, means for supporting the pressing plunger in vertical position and for reciprocating it in a vertical path extending from a level below the neck mold through the latter into said body mold in substantially axial alignment with said press mold, a cylindrical guide surrounding said plunger for guiding its vertical movements in relation to said inverted press mold, said cylindrical guide having an annular seat at its upper end, means for supporting said plunger guide at a predetermined level below said neck mold and so that said plunger guide may have a slight lateral floating movement in any direction, an annular seating member carried by said neck mold, said seating member having a lower end portion adapted to fit the seat at the upper end of said cylindrical guide, and means for vertically aligning said annular seating member and said plunger guide and for locking them together in aligned relation with each other.

9. In glassware forming apparatus, the combination with an inverted press mold comprising a body mold and a neck mold at the lower end of the body mold, a pressing plunger, means for supporting the pressing plunger in vertical position and for reciprocating it in a vertical path extending from a level below the neck mold through the latter into said body mold in substantially axial alignment with the latter, a cylindrical guide surrounding said plunger for guiding its vertical movements in relation to said inverted press mold, said cylindrical guide having an annular seat at its upper end, means for supporting said plunger guide at a predetermined level below said neck mold and so that said plunger guide may have a slight lateral floating movement in any direction, an annular seating member carried by said neck mold, said seating member having a lower end portion adapted to fit the seat at the upper end of said cylindrical guide, and means for vertically aligning said annular seating member and said plunger guide and for locking them together in aligned relation with each other, said last named means comprising a pair of pivoted clamping levers and jaws carried by said lever for engaging and clamping together superposed portions of the seating ring and the plunger guide at opposite sides of these parts, and releasable means for holding said clamping levers closed in relation to said seating ring and plunger guide.

10. In glassware forming apparatus, the combination with an inverted press mold comprising a body mold and a neck mold at the lower end of the body mold, a pressing plunger, means for supporting the pressing plunger in vertical position and for reciprocating it in a vertical path extending from a level below the neck mold through the latter into said body mold in substantially axial alignment with the latter, a cylindrical guide surrounding said plunger for guiding its vertical movements in relation to said inverted press mold, said cylindrical guide having an annular seat at its upper end, means for supporting said plunger guide at a predetermined level below said neck mold and so that said plunger guide may have a slight lateral floating movement in any direction, an annular seating member carried by said neck mold, said seating member having a lower end portion adapted to fit the seat at the upper end of said cylindrical guide, means for vertically aligning said annular seating member and said plunger guide and for locking them together in aligned relation with each other to align said plunger accurately with said neck mold, said last-named means comprising a pair of pivoted clamping levers having jaws engageable with superposed portions of the seating ring and the plunger guide at opposite sides of these parts when the levers are closed, releasable means for holding said clamping levers closed, and other means for actuating said clamping levers to disengage the jaws thereof from said superposed portions of the seating ring and plunger guide.

11. In glassware forming apparatus, the combination with an inverted press mold comprising a body mold and a neck mold at the lower end of the body mold, a pressing plunger, means for reciprocating said plunger in a vertical path extending from a level below the neck mold through the latter into said body mold in substantially axial alignment therewith, a cylindrical guide surrounding said plunger for guiding its vertical movements in relation to said inverted press mold, said cylindrical guide having an annular seat at its upper end, means for supporting said plunger guide at a predetermined level below said neck mold and so that said plunger guide may have a slight lateral floating movement in any direction, an annular seating member carried by said neck mold, said seating member having a lower end portion adapted to fit the seat at the upper end of said cylindrical guide, and having its upper portion formed to constitute a thimble cooperative with said neck mold and plunger to define an article neck finish forming cavity within said neck mold, and releasable means for vertically aligning said annular seating member and said plunger guide and for locking them together in aligned relation to each other to align said plunger with said neck mold during upward movement of said plunger.

12. In glassware forming apparatus, the combination with an inverted press mold comprising a body mold and a neck mold at the lower end of the body mold, a pressing plunger, a pneumatic cylinder disposed in vertical position below and in substantially axial alignment with said inverted press mold, a piston reciprocable in said cylinder, a piston rod projecting upwardly from said cylinder and supporting said plunger in approximately axial alignment with the cylinder, means for supplying and exhausting air under pressure to and from each of the opposite ends of the cylinder to reciprocate said piston in said cylinder, an open topped cylindrical holder supported on said cylinder, plunger guiding and positioning means disposed within said holder, said guiding and positioning means comprising a vertically movable cylindrical guide surrounding the plunger, a cylindrical casing within said holder and surrounding said guide, a thimble carried by said cylindrical guide for movement therewith vertically from a downwardly retracted position to and from an upwardly projected position at which it will cooperate with said neck mold and said plunger to define an article neck finish forming cavity within the neck mold, and means to cause upward and downward movements of the guide in unison with the plunger during only the lower portions of the complete upward and downward strokes of the plunger.

13. In glassware forming apparatus, the combination with an inverted press mold comprising a body mold and a neck mold at the lower end of the body mold, a pressing plunger, a pneumatic cylinder disposed in vertical position below and in substantially axial alignment with said inverted press mold, a piston reciprocable in said cylinder, a piston rod projecting upwardly from said cylinder and supporting said plunger in approximately axial alignment with the cylinder, means for supplying and exhausting air under pressure to and from each of the opposite ends of the cylinder to reciprocate said piston in said cylinder, an open topped cylindrical holder supported on said cylinder, and plunger guiding and positioning means disposed within said holder, said guiding and positioning means comprising a vertically movable cylindrical guide surrounding the plunger, a cylindrical casing within said holder and surrounding said guide, the latter having a piston portion slidably fitting within said cylindrical casing, a thimble carried by said cylindrical guide for movement therewith vertically between a downwardly retracted position below the neck mold and a raised position in contact and cooperative relation with said neck mold, means to cause upward and downward movements of the guide in unison with the plunger during only the latter portions of the complete upward and downward strokes of the plunger, and means for supplying air under pressure to the interior of the cylindrical casing beneath the piston portion of said guide when said guide is in its raised position to tend to maintain said thimble in cooperative relation with said neck mold and for supplying air under pressure to the interior of said guide above the piston portion thereof and thence around said pressing plunger to the interior of the neck mold when said plunger and said plunger guide have been retracted downwardly from their raised positions.

14. In glassware forming apparatus, the combination with an inverted press mold comprising separable and independently movable body and neck molds located at a glass charge pressing station, a pressing plunger, means for supporting the pressing plunger in vertical position and for reciprocating it in a vertical path extending from a level below the neck mold through the latter into the body mold of the inverted press mold at said pressing station, a thimble mounted within said neck mold for limited axial movement relative to the neck mold, a cylindrical guide surrounding said plunger for guiding its vertical movements in relation to said inverted press mold, said neck mold, thimble and guide having co-engaging portions when the neck mold is located at said pressing station for aligning these parts axially with one another, and spring means arranged between said thimble and said neck mold to urge the thimble and the neck mold axially apart to the limited extent permitted by the mounting of the thimble in the neck mold when the latter is moved upwardly from said pressing station.

15. In glassware pressing apparatus, the combination with an inverted press mold located at a fixed pressing station and having a glass charge receiving cavity open at its lower end, of a vertical pressing plunger and means for guiding, positioning and operating said plunger to maintain it upright in line with the inverted mold and to cause an upward movement of the plunger from a relatively low, mold-clearance position to a higher glass charge initial contact position at which the upper end of the plunger projects into the lower portion of the inverted mold cavity to a predetermined level therein and a further upward movement from said initial contact position to a still higher, glass pressing position at which the upper end of the plunger is in the upper part of the inverted mold cavity, and a downward stroke from its glass pressing position to its relatively low, mold clearance position, said means for guiding, positioning and operating said plunger being constructed and arranged to permit the upward strokes of the plunger in different cycles of reciprocation thereof to be stopped in the upper part of the inverted mold cavity at levels which may vary among themselves according to variations in the amounts of glass in the respective charges being pressed in said mold during said cycles and to position said plunger at the same relatively low, mold clearance position and at the same glass charge initial contact position in all of said cycles notwithstanding variations in the level of the glass pressing positions of the plunger in the same cycles.

16. In glassware pressing apparatus, the combination with an inverted press mold located at a fixed pressing station and having a glass charge receiving cavity open at its lower end, of a vertical pressing plunger and means for guiding, positioning and operating said plunger to maintain it upright in line with the inverted mold and to cause an upward movement of the plunger from a relatively low, mold-clearance position to a higher glass charge initial contact position at which the upper end of the plunger projects into the lower portion of the inverted mold cavity to a predetermined level therein and a further upward movement of the plunger from said initial contact position to a still higher, glass pressing position at which the upper end of the plunger is in the upper part of the inverted mold cavity, and a downward stroke serving to return the plunger from its glass pressing position to its relatively low, mold clearance position, said means for guiding, positioning and operating said plunger including means operable at will to vary the level in the lower part of the mold cavity of the initial contact position of the plunger without varying the levels of either the mold-clearance position or the glass pressing position of the plunger.

17. In glassware pressing apparatus, the combination with an inverted press mold located at a fixed pressing station and having a glass charge receiving cavity open at its lower end, of a vertical pressing plunger and means for guiding, positioning and operating said plunger to maintain it upright in line with the inverted mold and to cause an upward movement of the plunger from a relatively low, mold-clearance position to a higher glass charge initial contact position at which the upper end of the plunger projects into the lower portion of the inverted mold cavity to a predetermined level therein and a further upward movement of the plunger from said initial contact position to a still higher, glass pressing position at which the upper end of the plunger is in the upper part of the inverted mold cavity, and a downward stroke from its glass pressing position to its relatively low, mold clearance position, said means for guiding, positioning and operating said plunger being constructed and arranged to permit alteration thereof to vary the level of the relatively low, mold-clearance position of the plunger without varying either the level of the initial contact position or the level of the glass pressing position of the plunger.

18. In glassware forming apparatus, the combination with an inverted press mold open at its lower end, of a vertical pressing plunger, an air motor comprising a vertical cylinder located below and in line with the inverted press mold, a vertically reciprocable piston in the cylinder, a piston rod extending upwardly from the piston above the upper end of the cylinder and carrying said pressing plunger, and means to reciprocate said piston in said cylinder to move said pressing plunger vertically upwardly into and downwardly from the inverted press mold, a cylindrical holder mounted upon said first named cylinder between the latter and the inverted press mold, pressing plunger guiding and positioning means within said cylindrical holder, said cylindrical holder having a vertical slideway formed in the wall thereof, said slideway having a substantially T-shaped slot at its upper end open at the exterior of the cylindrical holder and having an inwardly offset open-bottomed chamber at its lower end open at the top of the cylinder of the air motor, and an indicator rod slidably disposed in said vertical slideway and having a laterally offset lower end portion depending through said open-bottomed chamber into the cylinder of the air motor in the path of upward movement of the piston in said cylinder so that said indicator rod will be raised in its slideway by said piston during the final part of each upward stroke of the latter, said indicator rod being of sufficient length to extend upwardly in said substantially T-shaped slot to the level of the head of the latter when said piston is at the upper limit of a complete upward stroke thereof.

GEORGE E. ROWE.

REFERENCES CITED

The following references are of record in the file of this patent:

UNITED STATES PATENTS

| Number | Name | Date |
|---|---|---|
| 608,022 | Bingham | July 26, 1898 |
| 650,722 | Jones et al. | May 29, 1900 |
| 767,935 | Good, Jr. | Aug. 16, 1904 |
| 856,067 | Johns | June 4, 1907 |
| 1,350,375 | Miller | Aug. 24, 1920 |
| 1,504,006 | Weaver | Aug. 5, 1924 |
| 1,670,821 | Pawling et al. | May 22, 1928 |
| 1,693,069 | Cramer | Nov. 27, 1928 |
| 1,729,363 | Schwenzfeier | Sept. 24, 1929 |
| 1,792,988 | Kadow | Feb. 17, 1931 |
| 1,807,857 | Moorshead | June 2, 1931 |
| 1,835,646 | Crile | Dec. 15, 1931 |
| 1,878,942 | Lobb | Sept. 20, 1932 |
| 1,911,119 | Ingle | May 23, 1933 |
| 1,929,842 | Forster | Oct. 10, 1933 |
| 1,945,983 | Rowe | Feb. 6, 1934 |
| 1,957,410 | Miller, Jr. | May 1, 1934 |
| 1,982,103 | Hiller | Nov. 27, 1934 |
| 2,020,031 | Kadow | Nov. 5, 1935 |
| 2,289,046 | Rowe | July 7, 1942 |
| 2,304,736 | Louden et al. | Dec. 8, 1942 |

FOREIGN PATENTS

| Number | Country | Date |
|---|---|---|
| 409,047 | France | Feb. 8, 1909 |

Certificate of Correction

May 23, 1950

Patent No. 2,508,890

GEORGE E. ROWE

It is hereby certified that error appears in the printed specification of the above numbered patent requiring correction as follows:

Column 17, line 36, for the word "to" after "position" read *of*; column 18, line 54, for "glass" read *press*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*